United States Patent Office 3,516,431
Patented June 23, 1970

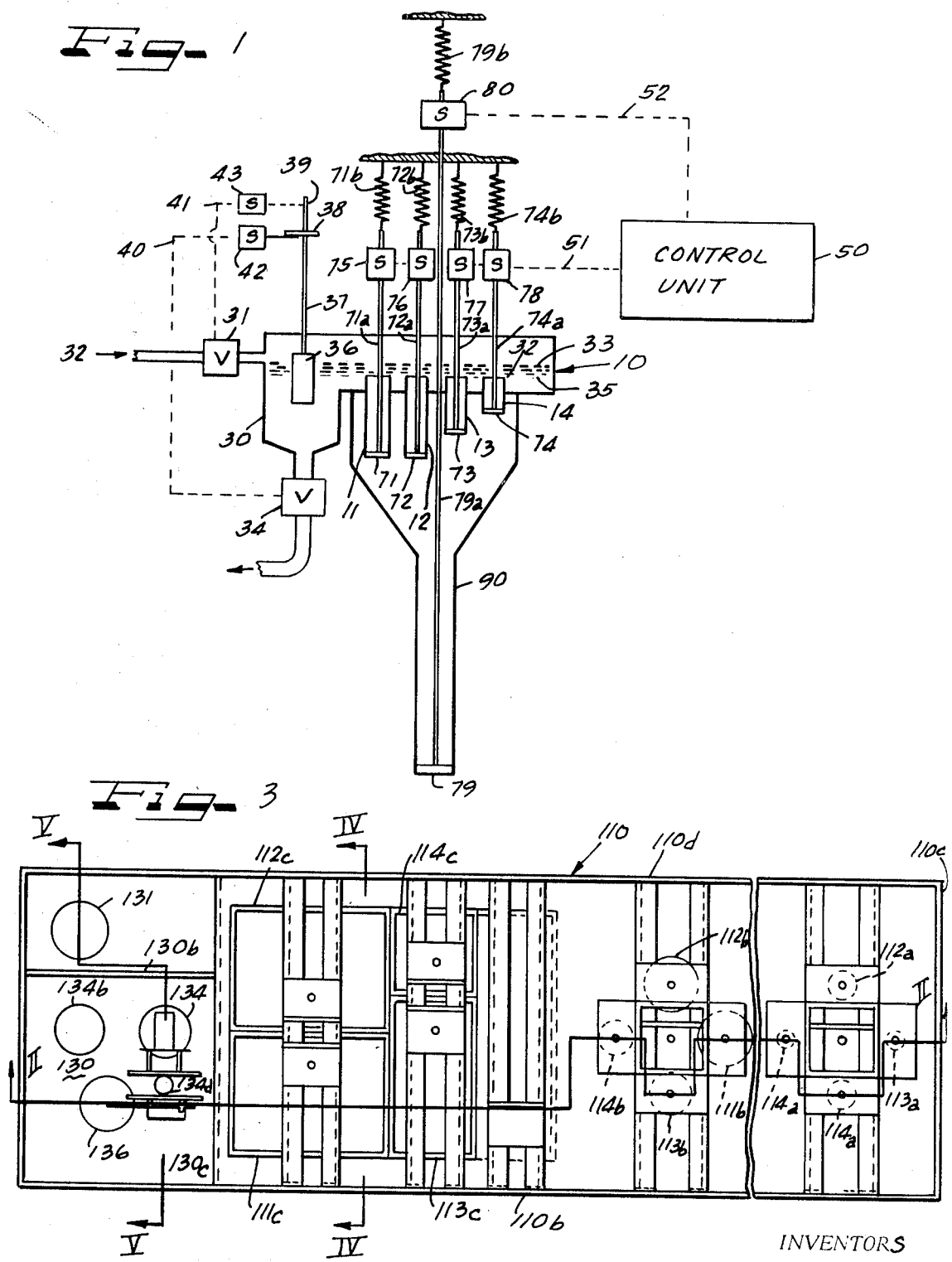

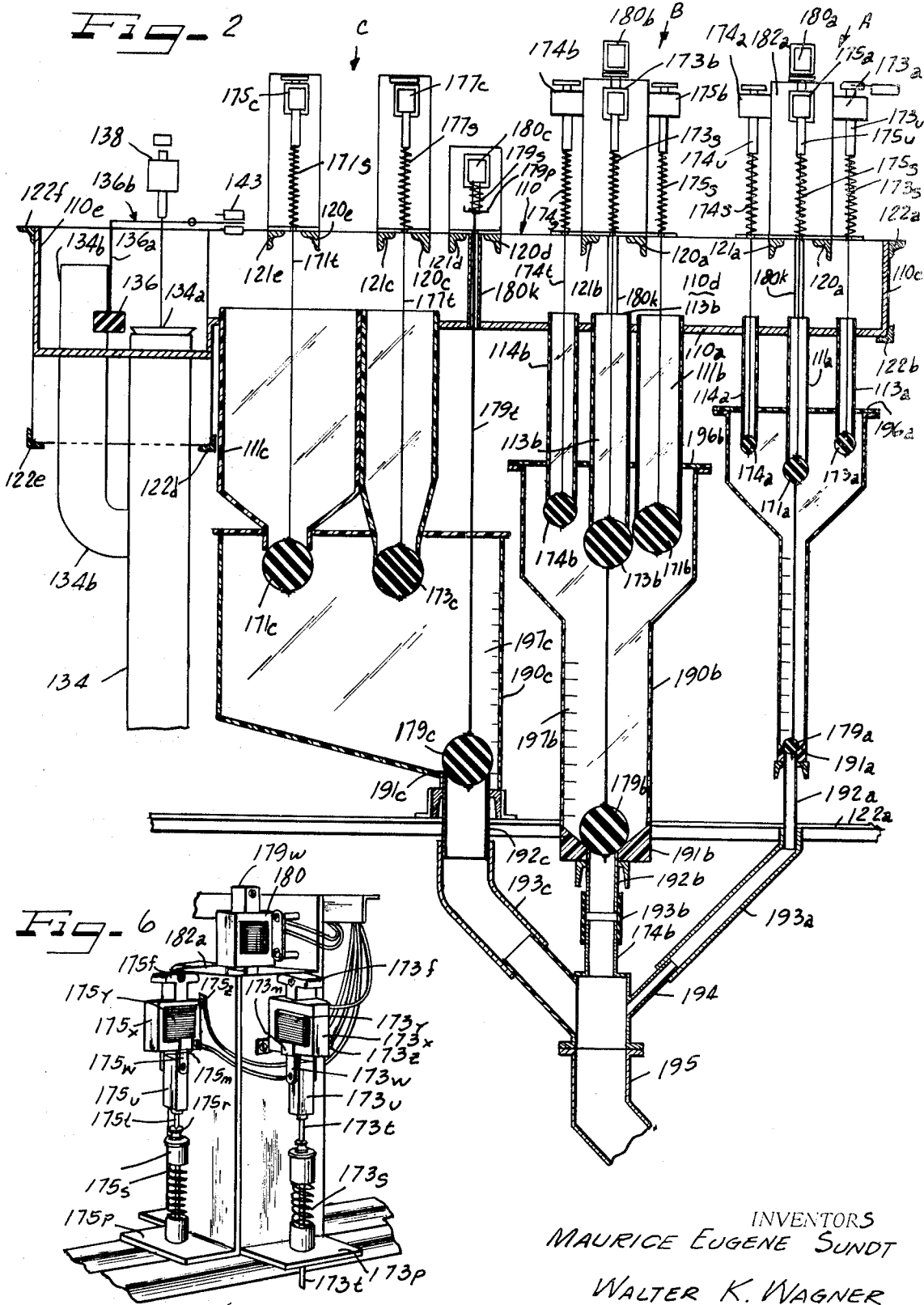

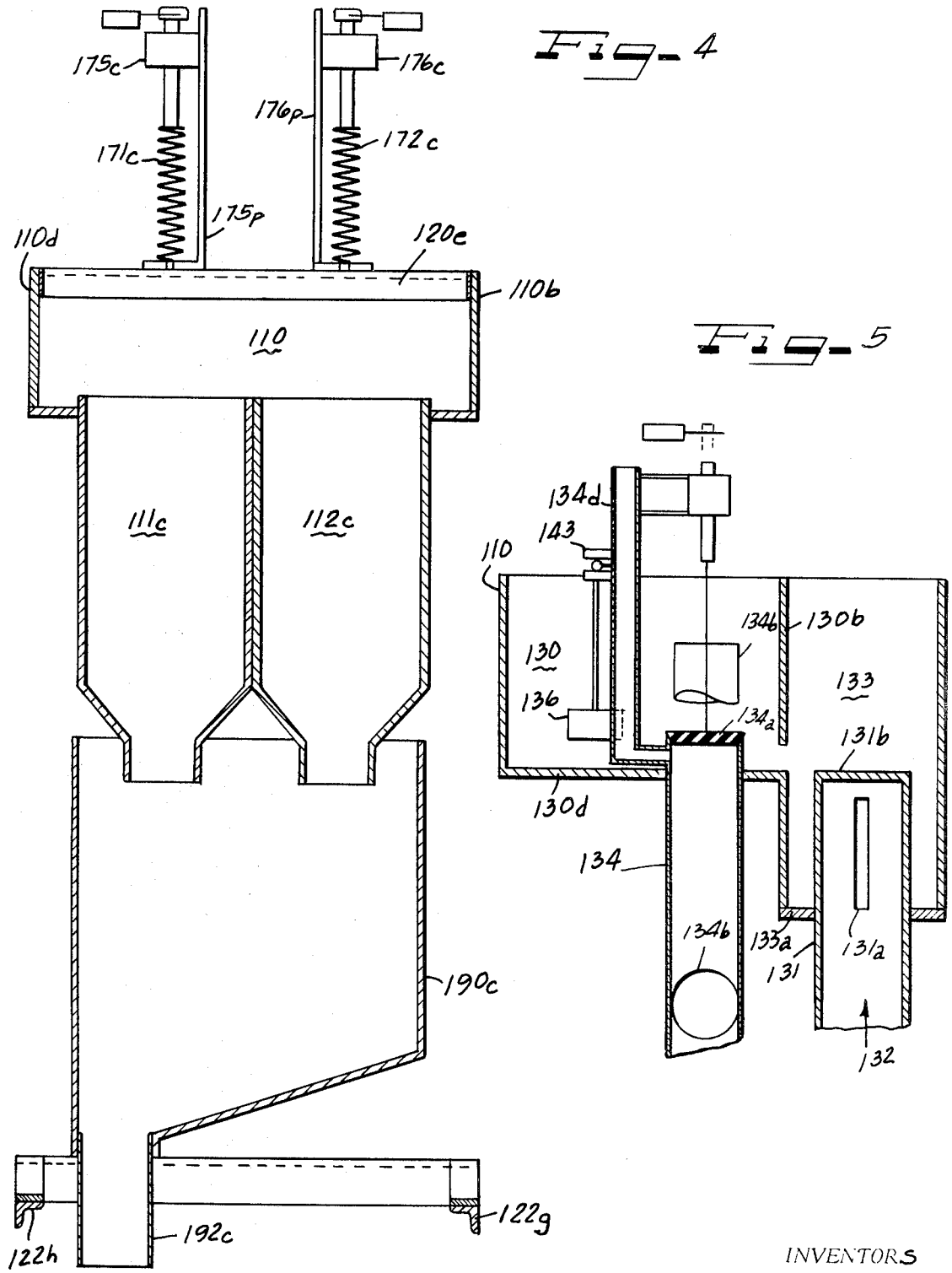

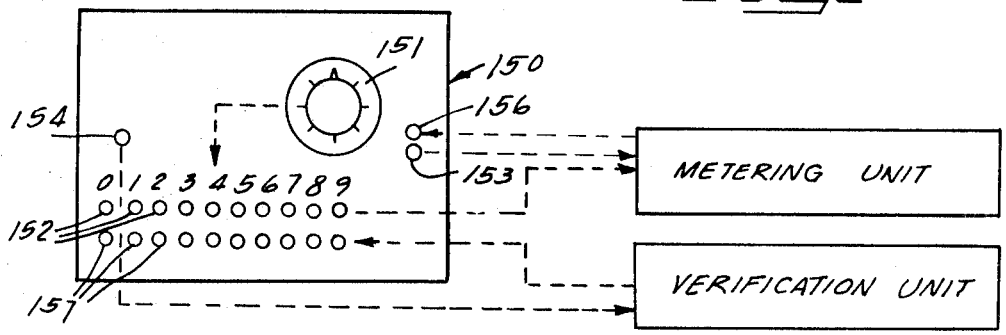
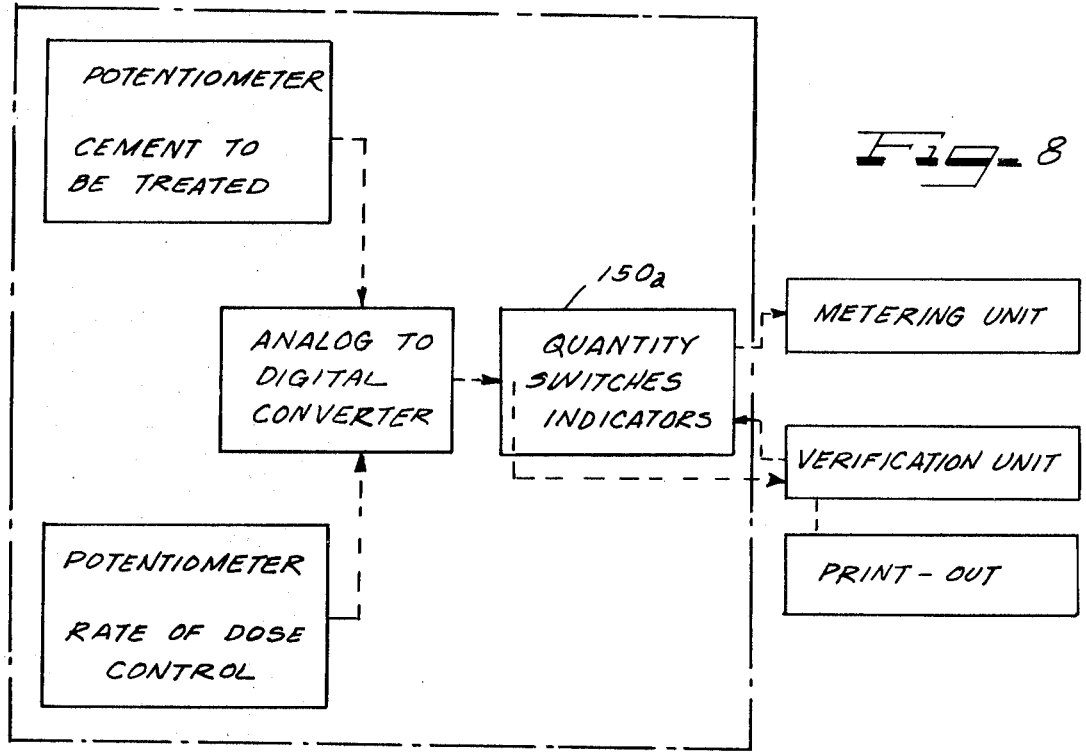
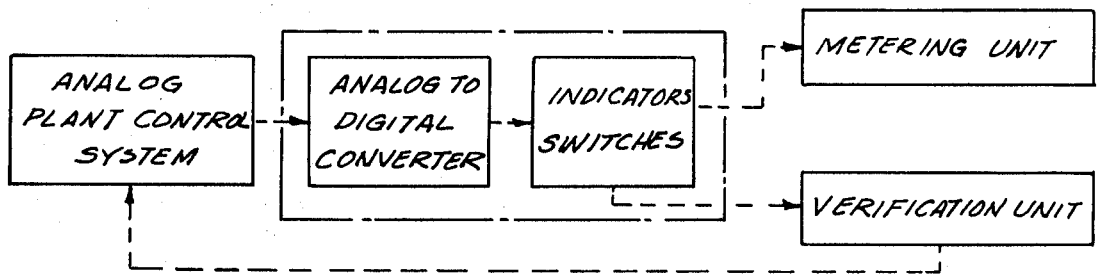

3,516,431
DIRECT DIGITAL SYSTEM FOR THE ACCURATE VOLUMETRIC BATCHING OF LIQUID SOLUTIONS OVER A WIDE RANGE OF REQUIRED AMOUNTS
Maurice Eugene Sundt and Walter K. Wagner, Albuquerque, N. Mex., assignors to Albuquerque Gravel Products Co., Albuquerque, N. Mex., a corporation of New Mexico
Filed Mar. 28, 1968, Ser. No. 716,886
Int. Cl. B67d 3/00; B65d 47/24
U.S. Cl. 137—266
10 Claims

ABSTRACT OF THE DISCLOSURE

Accurate volumetric batching of liquid solutions over a theoretically unlimited range of required amounts is accomplished quickly and conveniently by a direct digital system which comprises basically a one or more digit metering unit calibrated either in decimal or binary units, a verification unit which permits a visual and electrical check on the batched quantity and a control unit of either a manual, semi-automatic or automatic type. Each digit comprises a number of calibrated chambers of varying contents which may be combined to provide any measured quantity of liquid. The measuring chambers have an upper end with an opening therein mounted in a floodable pan so that when the pan is flooded the chambers are rapidly filled. Each chamber is closed at the bottom with a solenoid actuated valve that is set to allow complete emptying into the verification tank. In the manual control version the amount of liquid required for the batch is calculated and manually set while in the semi-automatic version an analog type system calculates the liquid required for a set admixture. In the automatic version the admixture quantity is automatically measured and the necessary liquid calculated. This system is especially adapted for use in a concrete batching operation.

BACKGROUND OF THE INVENTION

Field of the invention

This invention relates generally to direct digital dispensing systems for the accurate volumetric batching of liquid solutions over a wide range of required amounts. Specifically, the system comprises a plurality of functionally distinct units which may be structurally related to produce our invention. In this system, fluid to be measured flows initially into a free flooding metering unit having calibrated multiple chambers in which the metered liquid is stored prior to being dispensed. Upon release from their measuring chambers, the metered quantities flow into a verification unit which permits a visual and/or electrical check of the batched quantity to assure accuracy. Directly connected to the metering unit and the verification unit is a control unit which coordinates their functions so the system may be accurately and conveniently operated.

Prior art

In general, the prior art for accurate, volumetric batching of liquid solutions relates to analog measuring devices which utilize a cylinder-piston arrangement of the positive displacement type. These units, however, have the disadvantage that they function satisfactorily only within a comparatively narrow range of volumes. Thus, although analog measuring devices may all be adjusted to function satisfactorily over a limited range for a fixed set of conditions, they suffer in accuracy if there is a change in rate of flow or other conditions. Thus for example, to prevent overshoot, compensation must be made for "in air" or "free fall" material and for the lag between the cutoff signal and the actual closing of the valve. As batching speed is increased the problems are compounded. There are too many variables to cope with to permit accuracy over a wide range of required amounts and operating conditions. By contrast, the accuracy of the direct digital liquid batcher is not affected by these variables. It cannot overbatch since the selected measuring receptables must be completely emptied to reach the required amount and the batch cannot be dispensed if the liquid level is above the top of the calibrated tubes. Further, a batch cannot be started until all the receptacles have been completely filled to capacity. Moreover, the system can batch its smallest increment as accurately as its largest. Batching speed is controlled by the size of the discharge valves on the calibrated receptacles and can be made virtually instantaneous without affecting the accuracy. Recycling time depends, of course, upon the rate of flow to refill the dispenser; however, we have found that the batch-to-batch time can easily be 30 seconds or less. The capacity of our system is theoretically unlimited. The above are but a few advantages of the digital batching system and many more will become apparent with an understanding of this system.

A particular problem of the prior art which this invention overcomes is in the field of concrete batching to which this invention has successfully been applied. Thus, specifications for concrete require water to be measured to an accuracy of one percent of the required amount, but plant manufacturers will not guarantee any degree of accuracy of their scales and metering system when the required amount is less than thirty percent of the scaled or metered capacity. In a 16 cubic yard batching system, the water batcher would probably use a 6,000 pound dial scale, but this would be accurate only above 1800 pounds or 30 percent of its capacity. It is apparent that a one cubic yard batch requiring five percent or less of the scale capacity cannot be weighed to the required accuracy in this situation. Our direct digital batcher would have the capability of delivering down to 0.1 percent of its capacity to an accuracy of plus or minus one percent of the required amount. This solution to a long standing industry problem is considered to be new, useful, and unobvious.

SUMMARY

The direct digital system for high speed, accurate, volumetric batching of liquid solutions over a wide range of required amounts comprises basically as set out above, a metering unit, verification unit, and a control unit. Making up the metering unit are a bank or multiple banks of chambers which may be calibrated in either decimal or binary units. Thus, if the metering unit is calibrated in decimal units, a bank of four chambers of 3, 3, 2, and 1 unit capacity or four chambers of 2, 4, 2, and 1 unit capacity are combinable to make any number from 0 to 9. In the binary calibration chambers of 1, 2, 4, and 8 unit capacity are combinable to make any number from 0 to 15. These chambers are mounted vertically in a floodable pan that has a drain sump, float, high level switches and low level switches to control the introduction of the liquid into the metering devices. Each chamber is held closed at the bottom by a solenoid-actuated valve whose opening is controlled by a digital selector switch and associated circuitry in the control unit. The system is interlocked so that the valves cannot be actuated until the pan has been flooded to fill the tubes and drained to prevent more liquid to enter the tubes. Each valve is arranged to trip a switch when it opens to give electrical verification that the valves signaled by the control unit have, in fact, opened. Accuracy of the quantities metered by the chambers is assured through the accurate calibration of their contents. Moreover, a time-delay relay in the control unit is adjusted on the basis of the type of liquid and the rate of flow to assure the complete discharge of the selected chambers and thereby prevent overbatching or underbatching. Multiple banks of chambers may be readily added increasing the capacity of the system to any desired amount. For instance, by adding calibrated tubes of 30, 30, 20, 10, and 300, 300, 200, and 100, the capacity of the decimally calibrated system may be expanded to batch in units from 0 to 999. Similarly, in the binary calibration, adding chambers of 16, 32, 64, 128, 256, and 512 unit capacity will allow selection of from 0 to 1023 units in one unit increments.

Even though the metering unit has outstanding accuracy over its entire range, specifications may require a check on the batched quantity. This check may be made with a verification unit into which the calibrated contents selected from each digit pass. When provided with the decimal calibration, each digit or bank of chambers discharges into a clear plastic tank, calibrated from 0 to 9 and equipped with an electrically controlled discharge valve at its lowermost point. For a three digit metering unit, the capacity of the verification tanks would be 900, 90, and 9 units. In addition to or in lieu of the visual check, a remote electrical check may be provided through the installation of 10 electrical probes in each tank at the 0 to 9 calibration lines. This electrical "visual check" permits a zero interlock with an automatic batching console and allows a verification check to be made at the control unit before the verification tanks are discharged into the batch on command from the control unit.

Control of the direct digital batching system may be either manual, semi-automatic, or fully automatic. In the manual control, strictly manual setting of the required quantity to be dispensed is provided. If a verification unit with electrical probes is used, pilots representing the batched amount may be mounted adjacent to the required amount lights. Appropriate batch and dump switches, relays and associated circuitry provide remote control of the metering unit. This manual model may also include a manually set Veeder-Root data read-out counter or pushbutton digital switches with D.C. power supply, D.C. relays and diodes to select the proper valve combinations.

The semi-automatic version has a first potentiometer calculated in terms of the quantity of the material to be treated and a second potentiometer for a rate of dose control calibrated in units of admixture per unit batch of the material to be treated. In this model either a servo-driven Veeder-Root data read-out counter may be used to serve as an analog to digital converter or a servo-driven pulse switch may drive magnetic counters with data read-out switches. The latter data read-out switches select the appropriate valve combination through diodes and D.C. relays. Remote verification of the batched unit is shown on the panel and a bridge network provides interlocks to prevent discharge of the verification unit if the required batch valves should not open properly. A zero interlock is available from the verification unit and provision may be made for attaching a digital printer for recording the batched quantity.

In the fully automatic version used with an analog automatic batching console, the manually set dials for the quantities of the material to be treated and the rate of dose may be eliminated if the analog console provides signals for these functions. The analog to digital converter may also be eliminated where the batching console can provide the proper signals for selecting the proper combination of valves for any combination of material to be treated in rate of dose.

BRIEF DESCRIPTION OF THE DRAWINGS

FIG. 1 is a schematic view of a digital system for accurate volumetric batching of liquids having a single digit.

FIG. 2 is a cross sectional elevation view of a three digit liquid volumetric batching apparatus taken along the lines II—II of FIG. 3. Many of the elements are of a translucent material.

FIG. 3 is a plan view of the apparatus of FIG. 2.

FIG. 4 is a cross-sectional view taken along the lines IV—IV of FIG. 3.

FIG. 5 is a cross-sectional view taken along lines V—V of FIG. 3.

FIG. 6 is a perspective view of the valve control apparatus.

FIG. 7 is a schematic representation of a manual type control of invention.

FIG. 8 is a schematic representation of a semi-automatic control system of the invention.

FIG. 9 is a schematic representation of an automatic control system of the invention.

DESCRIPTION OF THE PREFERRED EMBODIMENT

As represented schematically in FIG. 1, this invention contemplates the digital volumetric batching of liquids through the use of apparatus which comprises a free-flooding tank 10 having measuring chambers 11, 12, 13, 14 in communication with the flooding tank 10 and depending downwardly therefrom so that when the tank is flooded the chambers will be filled. A valve 31 controls the flow of fluid into the tank and when opened allows a liquid 32 to flood the tank 10 to a level indicated at 33, whereby the opened ended measuring chambers 11, 12, 13, and 14 are completely filled to their calibrated amount. Once the measuring chambers have been filled, the valve 31 is closed and the liquid 32 is drained from tank 10 by opening a valve 34 until the liquid reaches a level below the top edge of the measuring chamber indicated at 35 so that no further fluid may enter into the measuring chambers 11–14. Automatic regulation of the liquid 32 in tank 10 between the upper level 33 and a level below that indicated at 35 is schematically illustrated in FIG. 1 wherein a float 36 moves up and down in response to the changing levels and through upstanding element 37 attached thereto makes contact at points 38, 39 with circuits 40 and 41. Thus, with valve 31 opened and the liquid 32 filling tank 10 to level 33, element 37 rises to point 39 where it activates circuit 41, thereby tripping microswitch 43 which in turn closes valve 31. Similarly, when valve 34 is opened and the level of the liquid 32 reaches a desired level below level 35, member 37 with a switch mechanism thereon drops to point 38, whereat it activates circuit 40 which through microswitch 42 closes valve 34, thereby stopping the further drainage of the liquid. At this point, chambers 11–14 have been filled to their calibrated capacity and the level of liquid 32 is below their uppermost openings. They are thus unable to receive further fluid and the digital volumetric apparatus is fully charged for batching. At this point, selection of the desired amount is made at a control unit 50 which may be remote from the digital apparatus. As will hereinafter be described in detail, the amount desired may be set directly or computed as an admixture. With this amount selected, the control unit serves to select the correct calibrated measuring chambers or combination of chambers in the digital apparatus necessary to provide the desired amount of liquid. This may be done manually, semi-automatically, or completely automatically.

Although other and different means of control are contemplated, the following is our preferred embodiment. In this system after the particular measuring chambers necessary to provide the desired amount of liquid having been selected, an electrical impulse is sent from control unit 50 over circuit 51 to the respective measuring chamber valve controls 75, 76, 77 and 78 for chambers 11, 12, 13 and 14, respectively. These valve actuating switches may conveniently take the form of solenoids. Thus, for example if the contents of measuring chambers 11 and 13 equal the amount of liquid desired, the impulse of circuit 51 will be directed to the valve switches 75 and 77, respectively where the solenoids would be activated and members 71a, 73a having valve means 71, 73 attached at each end, respectively, would be moved downwardly by the solenoids against the bias of spring 71b and 73b. The valves 71 and 73 would be opened allowing the entire contents of the measuring chambers 11 and 13 to be received at verification chamber 90. Similarly only one or any combination of measuring chambers 11, 12, 13 and 14 may be actuated to deposit their contents in verification tube 90. At this point verification tube 90 should contain the desired amount, however, it may be required to check the accuracy of this amount. This check may be made visually and/or electrically. With the amount desired having been verified, the control unit may be manually or automatically activated to send a signal through circuit 52 to valve operator 80 which will release the contents of verification chamber 90 into the batching system. Again, this valve operating means 80 can take the form of a solenoid which when energized will move member 79, functioning as a movable core, downwardly against the upward bias of spring 79b and thereby open valve means 79. The digital metering unit may be calibrated in decimal units, binary units, or other suitable units to effect the inventive concept. Thus, for example, if the meter unit is calibrated in decimal units, measuring chambers 11 and 12 might have a three-unit capacity, measuring chamber 13 a two-unit capacity, and a measuring chamber 14 a one-unit capacity so that any combination of digits from 0 to 9 could be made. Similarly in a binary version measuring chambers of 1, 2, 4 and 8-unit capacity could be combined to make any digit from 0 to 15. With the volumetric capacity of each chamber being very accurately measured, it follows that the sum of these chambers also will carry forward the same accuracy. The control unit and circuits have a time-delay relay switch which keep valves 71–74 open a sufficient time for the contents to completely empty therefrom. To assure that each chamber is properly filled, the system is interlocked so that the valves cannot be actuated until the pan 10 has been flooded to the level necessary to fill the measuring chambers and then drained to a level below the top of the measuring chambers whereby further liquid is prevented from entering the measuring chambers. An indication to the remotely controlled unit that the measuring chambers 71–74 have, in fact, been opened in response to the control unit, is provided by a trip switch on each measuring chamber valve which opens to give electrical proof that the valves have opened.

Referring to FIGS. 2 through 6, an embodiment of the invention is shown in which three digits are united in one apparatus having a volumetric batching capacity of from 0 to 999 under the decimal calibration. Referring initially to FIG. 2, the apparatus may be seen to comprise an upper free flooding tank portion 110 having sides 110b, 110c, 110d, and 110e. Bottom 110a has three banks of measuring chambers A, B, and C projecting therethrough so that the upper edges of each of the chambers lie in substantially the same common plane with one another. This plane is parallel to and above the horizontal plane of the bottom 110a. The measuring chambers are tube-like structures in banks A and B and take the form of rectangular tank-like structures in bank C. Each of the corresponding elements in each bank carries a suffix indicating to which bank it pertains. Of course, these chambers may take any form and configuration so long as they vary in capacity in accordance with the principles of this invention. Thus, the chambers may be of the same diameter in different lengths or of constant length and different diameter. Each measuring chamber is integrally connected with bottom 110a at a point below its upper edge so that the joint thereabout is leakproof. As may be seen, we have depicted the chambers as being of varying diameters and varying lengths depending on the varying distances below the tank bottom 110a. Each bank functions as one digit in a manner set out in the discussion of FIG. 1. For purposes of illustration, we have shown a decimally calibrated apparatus in FIGS. 2–5. Thus, bank A may provide quantities of liquid from 0 to 9 units. Similarly, bank B may provide quantities from 10 to 90 units. Bank C has a capacity range from 100 to 900 units. Specifically, chamber 114a holds one unit, chamber 113a holds two units, and chambers 111a and 112a each hold three units. Similarly, chamber 114b holds 10 units, 113b holds 20 units, and chambers 112b and 111b each hold 30 units, to provide any combination of from 10 to 90 units. Measuring chamber 114c holds 100 units, 113c has a capacity of 200 units, and chambers 112c and 111c each has a capacity of 300 units providing a range of from 100 to 900 units in 100-unit increments. In effect, bank A provides the "ones" digit while bank B provides the "tens" digit and bank C is the "hundreds" digit.

Each of the measuring chambers is open at its lowermost end and closed by a valve means represented by numbers 171–174 for banks A, B, and C. These valves are positioned below the measuring chamber openings and upwardly biased by respective spring means generally designated by the suffix s in each case. Of course, the measuring chamber openings and valves are designed so that the upwardly biased valves will completely seal the measuring chamber against leakage. Projecting upwardly from each valve through the respective measuring chambers is a tie member t indicated in each case with the suffix t. These tie members may be either flexible or solid and are attached to the biasing members s which, in turn, are connected to a plunger in the upper solenoid operating mechanism 171–174 with the suffix of each bank. An enlarged detailed view of the valve operating means of bank A is shown in FIG. 6. Here ties 173t and 175t may be seen projecting upwardly through support plates 173p and 175p and through the respective springs 173s and 175s and connected at their upper ends to blocks 173u and 175u respectively. The ties are threaded at their upper ends and nuts 173r and 175r serve to adjust the compression in members 173s and 175s. These compression springs bear against the nuts and force the respective valve tie rods upwardly, thereby firmly seating the valves in an adjustable leak-tight relation with measuring chamber openings. Pivotally attached to the blocks 173u, 175u are bars 173w, 175w which pass up through the solenoid and function as a movable core moving in response to the current passing through windings 173y, 175y located between plates 173x and 175x. Each bar 173w, 175w has an upper flanged portion 173f and 175f which limits the movement of the bar downwardly through the solenoid. In each case it may be seen that when electrical forces are passed through the coils the bar, being of the proper ferrous material and functioning as a core, is forced downwardly by the magnetic field, thereby compressing the respective spring means and opening the valve at the other end of the tie. In this relationship, the tie is preferably a rigid member. Of course, when the current is removed from the solenoid member, the spring means will once again come into play and force its respective valve back into a closed position. The time which the respective valves are held open is controlled by a time-delay relay switch which in each case is set so that there will be ample time for each of the respective measuring chambers to be completely emptied.

Where the tie members of the verification tank valve operating means extend through tank 110, they are sealed off from the tank by tube-like structures 180k. Plate-like members 196a, 196b, and 196c serve to cover the tops of the verification units to stabilize the measuring chambers while at the same time preventing loss of liquid from the verification unit. The entire apparatus framework may be of any suitable construction and configuration. In a selfstanding model we have found a framework made of right angle members shown at 120 and 121 for each bank of digit valve operating mechanisms and at 122 for the remaining portion of the framework.

Each of the verification units has conveniently placed indicia thereon for visual inspection of their capacity. As illustrated in FIG. 2, for example, the measuring chambers and verification units are shown as being transparent thereby making possible quick visual inspection. It is, of course, understood that in addition to the visual inspection or in lieu of the visual inspection, other means such as electrical probes may be provided to relay to a control center the quantities present in the verification units. The number and placement of the electrical probes will, of course, depend upon the type of calibration of the units and the accuracy desired. Since these probes are conventional they have not been shown.

The valve arrangement on the verification units is shown as being different than that of the measuring chambers; however, it should be noted that any convenient valve means can be used. Valves 179a, b, and c are adapted to seat over the lowermost opening of the verification units to serve as a plug. Operating means 180 for the valves 179 are similar to that used for operating the measuring chamber valves except that spring means 179s is positioned on tie 179t so as to force valve 179c downwardly into a leakproof engagement with the lowermost verification unit opening. Thus, when electrical energy is transmitted to the solenoids in the operating means 180, it pulls tie 179t upwardly against the bias of spring means 179s to allow the contents of the verification units 190 to fully empty. Again, a time-delay relay switch assures that the contents are completely emptied.

Contents of the verification units pass through conduit members 192a, b, and c to the point of use. Vibration absorbing members 193a, b, and c are provided in each case. These may be made of any suitable material.

OPERATION

A fluid 132 may be seen in FIG. 5 to enter through an inlet means 131, 131a, into tank portion 133 which opens on its one side into the free flooding tank 110 and on its other side into a tank portion 130. A closure 131b closes off the end of inlet 131 so that the incoming liquid must flow through openings 131a spaced about the circumference of the inlet 131 above a bottom 133a of the tank portion 133. Entrance of the fluid will be very rapid inasmuch as the rapidity of filling determines in great measure the cycle time. A baffle 130b has an opening at its bottom portion spaced from bottom 130d of the tank portion 130. This baffle 130b serves to segregate tank portion 130 from the inlet portion 133 so that turbulence of the liquid in portion 130 is reduced and the accuracy of float 136 and its associated controls is increased. The bottom 133a of inlet area 133 is considerably below the level of bottom 110a of tank 110 so that the water will enter the tank under conditions of submerged uniform flow thereby increasing the rate of flow in the free flooding area. Bottom 130d of tank portion 130 is below the level of bottom 110a of tank 110 so that drainage of the liquid to a level below the tops of the measuring chambers is facilitated.

As the liquid enters into tank portion 133 it rapidly spreads throughout the horizontally disposed tank 110 and portion 130 until it reaches the level of the top edge of the measuring chambers at which time it fills all of the chambers and continues to rise above the top edge of the measuring chamber.

The increase in the level of the liquid will be transmitted by the float 136 through links 136a and b to a microswitch 143 which will function similarly as the microswitch 43 in circuit 41 of FIG. 1, i.e., an electric impulse will be transmitted to shut off the inflow of liquid 132 through conduit 131. At this point, the measuring chambers are filled but the level of the liquid in the tank is above the measuring chambers. The removal of the excess liquid is accomplished either manually or automatically through the control system, whereby the valve operating means 138 is activated to pull valves 134a upwardly and thereby allow the contents of the tank 110 to be brought below the upper edge of the measuring chambers or complete emptied into drain means 134.

As the liquid level in tanks 110 and portions 130 and 133 drops, float 136 drops accordingly until at a desired level microswitch 143 is again activated to close the valve 134a in the drain means 134. This operation of the microswitch is similar to that of microswitch 42 in circuit 40 of FIG. 1. As a further safeguard against any possible malfunctioning of the microswitch 143 an overflow pipe 134b is provided having its upper edge at a desired uppermost level, thereby to drain off any excess liquid into a drain 134 for recirculation. When the liquid has reached its desired level and the drainage valve has been closed, the measuring chambers are each filled to their designated capacities and readied for the actual dispensing into the verification units. It might be noted that again the liquid level in the various tanks 110 and 130 and 133 may be checked by an electrical probe so that the contents of the measuring chambers are not dispensed while the liquid level in the tanks is above the top of the measuring chambers. After the desired amount to be dispensed has been selected in accordance with the procedures as hereinafter will be set out in the discussion of the operation of the control unit, the selected measuring chambers in each bank of metering units is activated to dispense its entire contents into the vertification units with valves 179 being closed at this point. After the quantity of the liquid has been verified in the tanks 190 the batch is ready to be dumped for transmission to the point of use.

Advantages readily apparent in this apparatus are the following: operation is quick, convenient, accurate and substantially foolproof. Opening one valve quickly floods tank 110 and fills the open ended chambers evenly and fully. Inflow stoppage and opening of the large drainage valve 134a may be set to occur substantially instantaneously so that the system will be ready to perform its intended function very rapidly. Leakage of the measuring chambers is prevented by the mechanical spring force in the operating mechanism which holds the valves of the measuring chambers firmly seated on the outlet openings. It should be noted here that all the dispensing valves are mechanically biased into a closed position, thereby making the apparatus immune to fluctuations or brief stoppages of electrical power since the valves undoubtedly will spend the majority of their time in a closed position. Moreover, the mechanical biasing means adapts to any changes in configuration of the valves and is self-adjusting for any wear that might occur. An advantage of the ball valves is that they provide minimum impedance of flow when the measuring chambers are emptying. Thus, dumping time of the chamber is very rapid so that the solenoid valve operating apparatus functions only very briefly. Also, the central connection of the rods t with the ball assures an even pressure around the edge of the annular opening. The distance which the ball valves drop may be varied in accordance with the flow design requirements of the system. Adjustment of this distance may be accurately and individually made for each measuring chamber by controlling the location of the flange f so as to limit the travel of the bar w through the solenoid. As may be seen in FIG. 6 this adjustment is easily accomplished by varying the distance which the tie rods t extend into the blocks u.

While the tie rods for the verification tank valves 179a, 179b and 179c operate under compression by contrast with the tie rods of the measuring chamber valves, the valve operating apparatus is similar. Thus each verification chamber valve operating means comprises a coil 180, a bar 179w extending through said coil, a spring 179s positioned between the bottom of the coil and a plate 179p adjustably attached to the tie rod 179t. In the operation of each valve operating mechanism energization of the solenoid serves to compress the spring and hold the valve open. The time period which each valve may be kept open may be varied to meet flow design requirements. This time lapse is conveniently accomplished through the use of a time delay relay switch. It should be noted here that the particular valve arrangements and combinations are set out by way of example only and that other equivalent means are within the contemplation of this invention.

FIGS. 7, 8 and 9 schematically show the control units in a manual, semi-automatic and automatic version respectively. Basically each of the control units functions to allow remote selection of the quantity of liquid to be measured. However, each varies in the degree of attention and supervision required.

In the manual version as shown in FIG. 7 a control means 150 is shown for a single decimal "tens" digit, i.e., a single bank of measuring chambers of a capacity from 0 to 9 units. It is to be understood, however, that this control unit may be expanded to include the "hundreds," "thousands," and other decimal digits, or the system may be calibrated on different bases such as binary. In the manual version the quantity of liquid required for a particular batch must be calculated beforehand so that a selector switch 151 may be manually set to the desired amount. The setting may be indicated directly by indicia about the dial 151 and/or by an indicator 152, usually a light, positioned on the control. The proper combination of measuring chambers necessary to dispense a particular desired amount may be preselected and incorporated in the control unit circuitry. In this regard we have found a ten position five-gang rotary switch to be suitable for the manual selector switch 151. Thus, in the decimal system depicted in FIG. 7 setting the manual control to the quantity 4 as shown will bring both a one unit and a three unit measuring chamber into the control unit circuitry.

Prior to the selection of the liquid quantities desired the measuring chambers will all have been filled to their proper capacities in accordance with the discussion and explanation of FIGS. 2 and 5. This operative condition of the metering unit may be reflected on the control board by a suitable means such as a light 156. If desired, the operative condition of the measuring chambers may be checked by electrical probes on the free-flooding pan and measuring chambers. The system may be interlocked so that the valves of the measuring chamber cannot be actuated until the pan has been flooded to fill the chambers and then drained below the level of the upper opening of the chambers to prevent liquid from entering the chambers after they start to empty.

Dispensing of the entire contents of the pre-selected measuring chambers is accomplished by a batch switch 153 which may be any suitable control such as a pushbutton or toggle switch. Activation of this switch energizes the solenoids of the valve operating means which in turn overcome the spring bias means on each selected measuring chamber to open the valve. The time which the valve remains open may be controlled for each chamber by a time delay relay switch to assure that the entire contents will be emptied into the verification tanks. The valve on each tube is arranged to trip a switch when it opens to give electrical proof that the valves signalled by the control unit have opened.

Verification may be entirely visual and/or it may be carried out by the use of electrical probes in the tank which will feed back a signal to an indicator 157, usually a light, on the control panel 150. On the manual version verification will be made visually either directly of the tank or indirectly through the electrical probe indicators on the control panel. With the quantity satisfactorily verified the liquid may be released from the verification tank by a dump switch 154 which will activate the verification tank valve operating means 180. Again a time delay relay switch may be included in the circuit to control the time the valve is open. A deluxe model of the manual version could include a manually set Veeder-Root data read-out counter or push button digital switches with DC power supply, DC relays and diodes to select the proper valve combinations.

In the semi-automatic control of FIG. 8 the material to be treated is depicted as cement and the liquid to be added is admixture. Here a first potentiometer calibrated in pounds of cement to be treated is manually set with the quantity of cement to be batched while a second potentiometer calibrated in units of admixture per 100 lbs. of cement is manually set for the rate of dose control. Through the use of an analog means the liquid admixture quantity is determined and this information is fed into an analog-to-digital converter for transmission to a control panel 150a. The converter may be a servo driven Veeder-Root data read-out counter or a servo driven pulse switch driving magnetic counters with data read-out switches. These data read-out switches select the appropriate valve combinations through diodes and DC relays. The control panel 150a may be equipped with switches and indicators similar to those shown on the manual version. The greatest advantage of the semi-automatic version over the manual version is the calculation of the liquid admixture from known cement quantities and rate of dose amounts. Again, remote verification of the batched amount would be shown on the control panel and a bridge network may be provided to prevent discharge of the verification unit if the required measuring chamber valves did not open properly or some other valve function may have prevented obtaining the quantity desired. Zero interlock may also be provided on the verification unit to assure accurate batching. A digital printer may be attached to the system for recording the batched quantities.

The fully automatic version schematically shown in FIG. 9 contains an analog plant control system whereby the manually set dials for cement quantity and rate of dose may be eliminated if the analog console provides signals for these functions. It is further envisioned that for a required batched quantity measured either in weight or volume the analog console would calculate the amount of cement and admixture required and provide the necessary system controls to assure that the required batch quantity would be automatically made available. As in the semi-automatic version an analog-to-digital converter is provided. However, with a direct digital automatic batching console the analog-to-digital converter could be eliminated if the direct digital system used to control the plant can provide the necessary signals for selecting the proper combination of measuring chamber valves. Again the indicators and switches may be provided on the control panel in a manner to that set out for the manual version. However, as is the case for the semi-automatic version, the manual liquid quantity switch would not be necessary.

It is within the contemplation of this invention to provide an efficient and convenient digital batching system which may be automated to any degree desired. It is also contemplated that for the different combinations and types of material to be batched other arrangements and combinations of the apparatus set forth in this application may be made by one skilled in the art without departing from the scope of our invention. Thus, for example, where it may be necessary to combine two different liquids to make the admixture, it is contemplated that dual sets of measuring chambers may be provided and these could empty into one large verification tank. Also if the liquid requires treatment or conditioning as, for example, by heating or mixing, it is within the scope of this invention to add the necessary equipment in the system to so complete the functions desired. The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description and all changes which come within the meaning and range of equivalency of the claims are therefore intended to be embraced therein.

We claim as our invention:

1. A direct digital system for high speed, accurate, volumetric batching of liquid solutions over a wide range of required amounts comprising:
   (A) a metering unit having
      (1) a plurality of generally upright measuring chambers of specified capacity, each said chamber having an upper opening and a lower opening therein, a valve means in each of said lower openings permitting said chambers to be filled and emptied,
      (2) a floodable pan generally horizontally disposed at a level below the upper chamber openings, said pan having a bottom surface through which said chambers project and side walls upstanding from said bottom above the level of said chamber openings so that when said pan is flooded to a level above said upper openings said chambers are all filled to their specified capacity,
      (3) means for introducing liquid into said pan and
      (4) means for emptying the liquid from said pan below the level of said measuring chamber upper openings,
   (B) a verification unit having
      (1) a tank of a capacity at least as great as the aggregate of said measuring chambers positioned so that the contents of each of said chambers may flow thereinto and their aggregate amount may be verified,
      (2) means for verifying the quantity of liquid present in said verification tank,
      (3) a valve means allowing filling and emptying of said verification tank.

2. A direct digital system according to claim 1 including:
   (A) a control unit for said metering and verification units comprising an electrical circuit having therein:
      (1) a liquid quantity selector means set to incorporate in the circuit a pre-determined number of measuring chamber valve means for each quantity of liquid selected,
      (2) a batch switch means to energize the selected measuring chamber valve means included in the circuit and thereby allow their contents to empty into the verification tank,
      (3) a dump switch to energize the valve means on the verification tank and allow the contents to flow to the intended point of use.

3. A direct digital system according to claim 2 including an indicator on said control unit signalling the operational readiness of the matering unit, an indicator showing the quantity of liquid selected, an indicator showing the quantity of liquid in the verification tank, and a time delay relay switch regulating the time interval that each measuring chamber and verification tank valve is open so that each will empty completely.

4. A direct digital system according to claim 2 wherein the liquid quantity selector means is set to a required amount of liquid by a servo driven data readout counter which in turn is controlled by potentiometer means feeding information thereto of the quantity of material to be treated and the rate of dose per unit of quantity to be treated.

5. A direct digital system according to claim 1 wherein said metering unit is of a decimal base and each digit includes four measuring chambers in the ratio of 1:9, 2:9, 3:9 and 3:9, or four measuring chambers in the ratio of 1:9, 2:9, 2:9, and 4:9.

6. A direct digital system according to claim 1 wherein said metering unit is of a binary base and the digits include measuring chambers of the capacity of 1 unit and 2 raised to consecutive powers units.

7. A direct digital system according to claim 1 wherein the verification tank is transparent and has indicia thereon for visually ascertaining the contents.

8. A direct digital system according to claim 2 wherein the verification tank has electrical probes thereon in an electrical circuit for transmission to the control unit, said electrical probe circuit being interlocked with said dump switch so that said verification tank valves may not be energized when the quantity in the verification tank is not the selected quantity.

9. A direct digital system according to claim 1 wherein each of said measuring chamber upper openings lie in generally the same horizontal plane, said free flooding pan including an inlet portion and an outlet portion, said inlet portion having a fluid inlet below the bottom surface of the pan so that uniform submerged inlet flow is achieved, said outlet portion having a drain below the level of the bottom surface of the pan and an automatic fluid level control means regulating the level of the fluid in the pan between pre-determined limits through the use of a float and microswitch arrangement.

10. A direct digital system according to claim 2 wherein the valve means of each of the measuring chambers and verification tanks comprises a plug-type valve, a valve operating means and a tie rod connecting said plug-type valve to said operating means, said operating means including a support plate attached to said pan, a solenoid coil, a bar passing through said coil and having an upper end and a lower end, said bar functioning as as a core which moves in response to the magnetic field set up by electric current passing through the core, a block pivotally attached to the lower end of said bar, said tie rod extending through the respective measuring chamber or verification tank, through the free flooding pan and through the support plate to a threaded engagement with said block, said measuring chamber valves having a first resilient compression spring surrounding said tie rod and extending between said support plate and said block, said first spring biasing said bar, block, tie rod and valve upwardly, a flange on the upper end of the bar of said measuring chamber valves, said flange limiting the movement of the bar downwardly through the coil, said verification valves having a second resilient compression spring surrounding said tie rod and extending between a point on said tie rod to a point below said coil, said second spring biasing said tie rods and valve downwardly, a stop means on said verification valve bar below said coil, said stop means limiting the movement of the bar upwardly through the coil, said measuring chamber and verification tank valve means operating in response to said control unit selector and switch means.

References Cited

UNITED STATES PATENTS

| | | | |
|---|---|---|---|
| 383,979 | 6/1888 | Perkins | 137—262 XR |
| 2,167,438 | 7/1939 | Kaufman | 137—266 XR |
| 2,935,993 | 5/1960 | Hurter | 137—266 |
| 3,344,801 | 10/1967 | Bessman | 137—266 XR |

HENRY T. KLINKSIEK, Primary Examiner

R. J. MILLER, Assistant Examiner

U.S. Cl. X.R.

137—606